F. A. WASSON.
ROLLER BEARING.
APPLICATION FILED OCT. 7, 1916.
1,269,235.
Patented June 11, 1918.
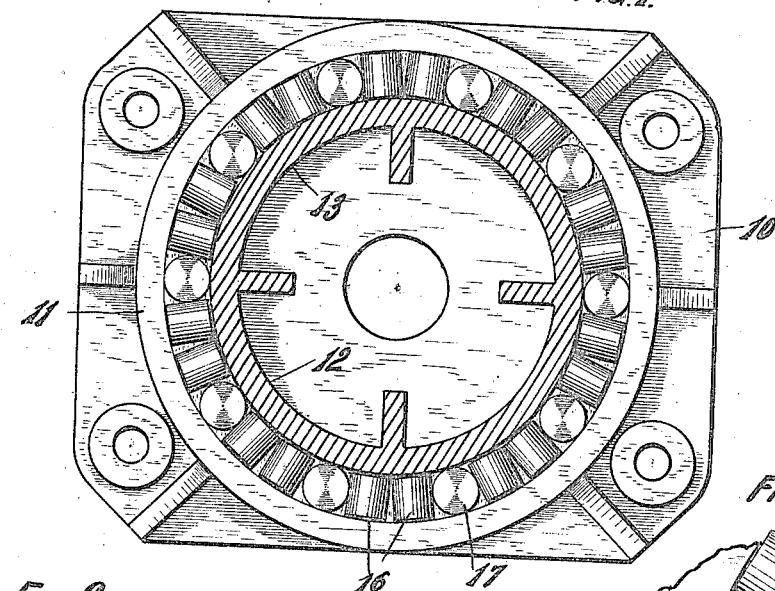
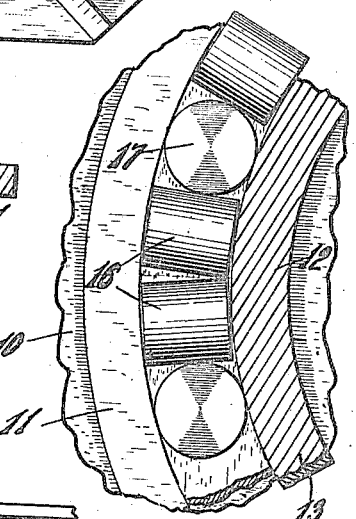
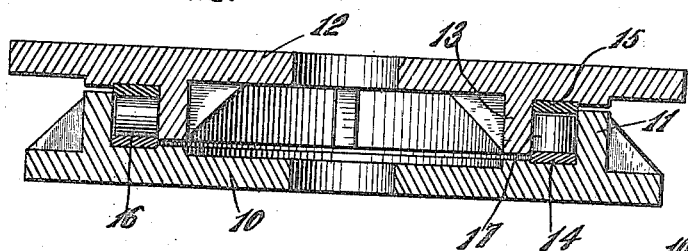
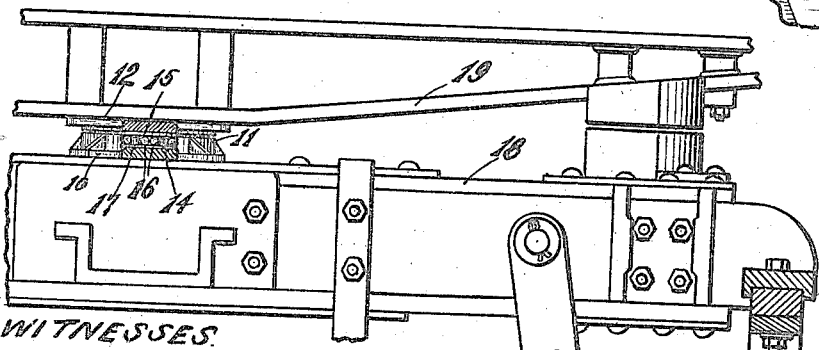
WITNESSES.
INVENTOR.
Frank A. Wasson,
By R. S. Caldwell,
ATTORNEY.

UNITED STATES PATENT OFFICE.

FRANK A. WASSON, OF MILWAUKEE, WISCONSIN, ASSIGNOR TO WASSON ENGINEERING AND SUPPLY COMPANY, OF SANTA ROSA, CALIFORNIA, A CORPORATION OF CALIFORNIA.

ROLLER-BEARING.

1,269,235.      Specification of Letters Patent.      Patented June 11, 1918.

Application filed October 7, 1916. Serial No. 124,253.

*To all whom it may concern:*

Be it known that I, FRANK A. WASSON, a citizen of the United States, and resident of Milwaukee, in the county of Milwaukee and State of Wisconsin, have invented new and useful Improvements in Roller-Bearings, of which the following is a description, reference being had to the accompanying drawings, which are a part of this specification.

This invention has for its object to provide a roller bearing adapted to take side thrust as well as end thrust by means of cylindrical rollers with their axes at right angles to each other and arranged in the same race-way.

Another object of the invention is to provide a bearing intended for slight oscillating movement of the part supported thereby and so designed that radially disposed rollers will have a tendency to shift their positions and avoid the wearing of pits or pockets by reason of their returning to the same position after each oscillatory movement of the supported structure.

Another object of the invention is to provide a roller bearing particularly designed for use as a center-bearing for railway trucks and especially for the trucks of electric railway cars where the bearing may carry current, the line contact of the numerous rollers affording ample contact surface for this purpose.

With the above and other objects in view the invention consists of the roller bearing as herein claimed and all equivalents.

Referring to the accompanying drawing, in which like characters of reference indicate the same parts in different views:

Figure 1 is a sectional plan view of a roller bearing constructed in accordance with this invention;

Fig. 2 is a vertical sectional view thereof;

Fig. 3 is a sectional detailed view of a fragment thereof; and,

Fig. 4 is a view partly in section of a portion of a railway truck equipped with the roller bearing of this invention.

In these drawings 10 indicates a base plate having an upstanding annular flange 11 forming the outer wall of a race-way. An upper or companion plate 12 has a depending annular flange 13 of smaller diameter than the flange 11 and concentric therewith to form the inner wall of the race-way. A hardened metal lining ring 14 is placed on the base plate 10 inside of the flange 11 and a similar lining ring 15 is placed on the upper plate 12 outside of the flange 13 to form respectively the bottom and the top walls of the race-way.

Cylindrical rollers are arranged in the race-way, horizontal rollers 16 for the most part set off in groups at regular intervals by vertical rollers 17, though the latter may alternate with the former in cases where the side thrust is great. Although the bearing is not confined in its use to any particular application, it is especially adapted for use as the center-bearing of the trucks of electric railway cars and is so shown in Fig. 4 where the truck bolster 18 has the base plate 10 secured thereto and the car beam 19 is provided with the upper plate 12.

In operation the weight of the car body or other structure supported by the bearing, is taken by the horizontal rollers 16 and the lining rings 14 and 15, while the side thrust, as when the car is rounding a curve, is taken by the vertical rollers 17 and the flanges 11 and 13.

It is a well-known fact that, from one cause or another, there is a slight oscillation of a railway truck on its kingpin even when the car is traveling on a straight track. With center-bearings in which balls or conical rollers are used as anti-friction members such members by rocking back and forth over substantially the same points in the race-way wear pits or depressions forming grooves or pockets in the bearing surface of the race-way which as they increase in depth tend to trap the balls or rollers and prevent their freely traveling when occasion requires, on turning around a curve. Thus the short oscillating movements of the truck in the travel on a straight track tend to create a condition in the bearing which prevents a free operation of the bearing to accommodate the greater movements of the truck on a curved track. With the roller bearing of the present invention, however, the tendency to wear such roller retaining pits is largely overcome by the fact that the rollers are truly cylindrical and therefore tend to travel in straight lines tangent to the race-way. Sufficient play is provided for them in the race-way so that they are capable of shifting their axes to avoid a truly radial position and consequently distribute the normal bearing duty over a greater area of surface of the bearing walls of the race-way and reduce their tendency to wear pits or cavities. This effect is of greater importance when the bearing is relied upon to carry an electric current as in the case of center-bearings for electric railway trucks, and bearings for trolley bases and the like, for then the arcing at the points of contact serves to increase the pit forming tendency of the rollers or balls and such tendency is retarded by spreading the normal contact surface of the race-way over a greater area. It will be noted that the presence of the vertical rollers allows greater opportunity for the horizontal rollers to shift their positions so as to be other than radial, but of course the primary function of these vertical rollers is to prevent the horizontal rollers being crowded between the flanges 11 and 13 forming the side walls of the race-way or, in other words, to take the side thrust of the bearing. These vertical rollers are slightly shorter than the distance between the lining rings 14 and 15 and slide on their lower ends thus further tending to avoid the formation of hollows by scouring the surface of the lower lining ring 14. The lining rings 14 and 15 being removable are capable of being renewed when the bearing is worn, thus restoring the bearing to its original condition without involving considerable expense.

It is obvious that this invention is capable of general application, though it is particularly efficient where it has to serve the threefold duty of sustaining end thrust and side thrust and of carrying a heavy electric current.

It will be noted that the object of the invention is not so much to reduce friction as it is to reduce wear and to increase current carrying capacity. The slight resistance offered to the turning movement due to the non-radial positions of the rollers is, therefore, unobjectionable. On the other hand, it may serve to hold the truck steady against the usual tendency to nose first to the right and then to the left.

What I claim as new and desire to secure by Letters Patent is:

1. A roller thrust bearing for conducting electrical current having an annular raceway between relatively fixed and oscillatory parts and cylindrical rollers arranged in the race-way in approximately radial positions, and means for confining the rollers within the race-way and permitting a slight tangential travel thereof to shift their axes out of the radial positions, so that they advance and return in different paths and wear their contacting surfaces clean.

2. A roller bearing for conducting electrical current comprising a base having an annular flange, a companion plate also having an annular flange of different diameter from the annular flange of the base plate and forming the side walls of a race-way therebetween, cylindrical rollers in the race-way in approximately radial positions and having sufficient play between the flanges to permit of slight straight line movements thereof tangent to the inner flange to slightly shift them from their radial positions, and wear their contacting surfaces to maintain their conductivity.

3. A roller bearing for conducting an electrical current comprising a base having an annular flange, a companion plate having an annular flange of different diameter, hard metal lining rings removably secured inside the larger flange and outside the smaller flange, cylindrical rollers in approximately radial positions within the race-way and having sufficient play between the flanges to permit of slight straight line movements thereof to depart from truly radial positions and polish their contacting surfaces to maintain conductivity.

4. A roller bearing for conducting an electrical current comprising a base having an annular flange and a companion plate having an annular flange of different diameter, one flange positioned within the other to form an annular race-way therebetween, cylindrical rollers radially positioned and having sufficient play between the flanges to permit of short straight line movements thereof, so that they wear sufficiently to maintain conductivity, and other cylindrical rollers positioned between the radially disposed rollers and having their axes parallel with the axis of the bearing and taking the side thrust of the bearing by fitting between the flanges.

5. A roller bearing to constitute a current carrying centerbearing for electrical railway trucks comprising a base adapted to be attached to the bolster of the truck and provided with an upstanding annular flange, a companion plate adapted to be secured to the beam of a car body and provided with a downwardly extending annular flange positioned within the flange of the base and forming an annular race-way therebetween, hard metal lining rings removably secured to the base and the companion plate respectively and forming the top and bottom walls of the race-way, cylindrical rollers located within the race-way and bearing against the lining rings and having approximately radial positions but free to have slight straight line movements to depart from the true radial positions, so as to wear their contacting surfaces clean and maintain conductivity, other cylindrical rollers positioned between the radial rollers and bearing against the flanges to take the side thrust of the bearing and having their axes approximately parallel with the axis of the bearing.

In testimony whereof I affix my signature in presence of two witnesses.

FRANK A. WASSON.

Witnesses:
R. S. C. CALDWELL,
H. D. CHASE.

Copies of this patent may be obtained for five cents each, by addressing the "Commissioner of Patents, Washington, D. C."